April 28, 1953                A. L. SMITH             2,636,569
MEANS FOR SEPARATING GAS FROM DRILLING
MUDS AND ANALYZING SAME
Filed Sept. 29, 1947
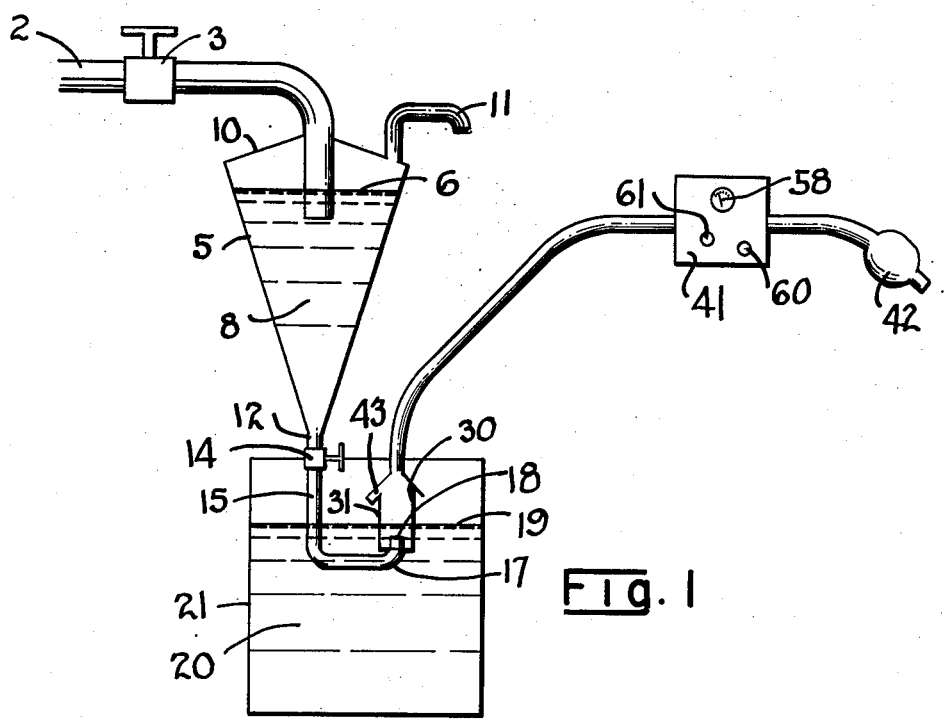
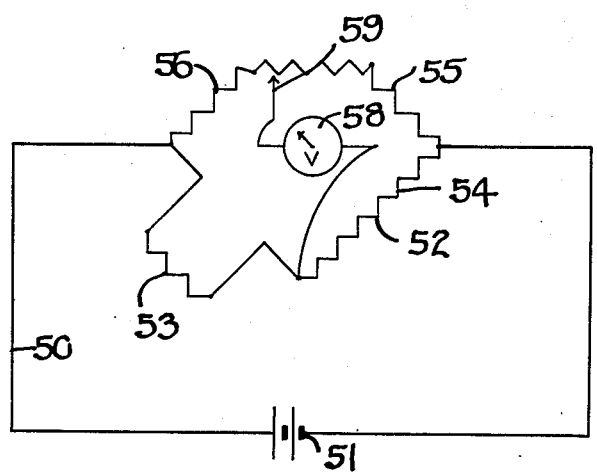
INVENTOR.
A. L. SMITH
BY Lester B. Clark
& Ray L. Smith
ATTORNEYS Patented Apr. 28, 1953

2,636,569

UNITED STATES PATENT OFFICE 2,636,569

MEANS FOR SEPARATING GAS FROM DRILLING MUDS AND ANALYZING SAME

Alonzo L. Smith, Houston, Tex.

Application September 29, 1947, Serial No. 776,785

3 Claims. (Cl. 183—2.5)

In the rotary method of drilling wells where drilling mud is circulated down into and upwardly through the well bore, it has been determined that such drilling mud will act as a carrier to bring gas from the earth formations to the surface.

The present invention is directed to a means for detecting gas in such returning mud with a view of determining the location, volume, and character of the gas carried to the surface by the drilling mud.

This application relates generally to the subject matter of my prior copending application, Serial Number 230,274, filed September 16, 1938, for Gas Detector for Drilling Muds, and is entitled to the benefit of the filing date thereof for all common subject matter.

The drilling mud returning to the surface in the rotary method of drilling is usually quite viscous and gas carried by such mud is usually entrained therein so that difficulty has been encountered in effecting release of the gas from such viscous mud.

The present invention contemplates that the drilling mud will be diluted so as to reduce the viscosity thereof with a view of releasing entrained or occluded gases therefrom.

Another object of the invention is to pass a sample of the returning drilling mud into a container of diluent for the liquid phase of the drilling mud with a view of so diluting the drilling mud that a positive and convenient release of the gas is obtained.

Another object of the invention is to control the discharge of a stream of drilling mud returning from a well bore in the rotary method of drilling in such a manner as to dilute the drilling mud, release the gas therefrom, and to then carry out a procedure for detecting the presence or absence of gas.

Another object is to detect the presence or absence of hydrocarbons in drilling mud.

Another object of the invention is to flood a sample of drilling mud with a diluent of the liquid phase of the mud so as to effectively reduce the viscosity of the mud, and in this manner free the gas which was entrained by the mud.

Still another object of the invention is to provide an apparatus for releasing a sample of drilling mud into a container of the diluent and trapping any gas released from the mud in order to subject such gas to combustion to determine the presence or absence of gas.

Another object of the invention is to discharge a stream of drilling mud below the surface of a liquid diluent and to trap gas released by such operation in combination with subjecting such gas to combustion.

Other and further objects of the invention will be readily apparent when the following description is considered in connection with the accompanying drawings, wherein:

Fig. 1 is a diagrammatic arrangement illustrating the means for practicing the method.

Fig. 2 is a wiring diagram of a Wheatstone bridge circuit of the combustion type gas indicator or recorder.

The mud returning from the well in the rotary method of drilling may have entrained therein gas from a formation which has been penetrated and it is the detecting of the presence or absence of such gas that is contemplated by this invention. Of course gases from other sources may be detected if desired.

The pipe 2 indicates generally the return line or pipe through which the drilling mud returning from the well will pass to the slush pit for recirculation in the well. The valve 3 is incorporated in this return line. A container 5 of any suitable shape, size, or configuration is shown as having been arranged about the end 6 of the return line 2, and this container 5 is intended to receive a quantity, specimen, or sample of the drilling mud 8 which is returning from the well.

This container 5 is preferably covered at 10 and has a vent 11 so as to equalize the pressure within and without the container. It seems clear that this container may trap all or only a portion of the returning mud, the principal idea being to retain a representative sample or specimen of the drilling mud which can be subjected to examination to determine the presence or absence of gas.

The discharge end 12 of this container is controlled by a valve 14 which has a discharge pipe 15 connected thereto. This discharge pipe preferably includes a return bend 17 so that the outlet or discharge end 18 of such pipe is disposed below the surface 19 of a body of diluent 20 contained in the vessel 21.

It seems obvious that any suitable solvent or diluent may be employed, depending upon the nature, character, and ingredients of the drilling mud. If the liquid phase of the drilling mud is a water base, generally known as a water base drilling mud, then it is quite probable that the liquid 20 would be water. On the other hand, if the liquid phase of the drilling mud were some other material other than water, a diluent or solvent therefore would be employed.

The principal feature of the invention is to provide a means and method whereby the viscosity of the drilling mud discharging from the well may be substantially reduced by diluting the mud so that when the mud is thus diluted, it will release even minute particles of gas which were entrained by the drilling mud. Thus, for instance, the drilling mud discharging from the end 18 of the pipe 15 would move into the body of liquid 20 so that the mud would be diluted, viscosity reduced, and a tendency created for the solids in the mud to settle in the vessel 21. Of necessity any gas entrained by the mud would in this manner be released due to the dilution of the mud and a very substantial reduction in its viscosity.

In order to determine whether or not gas or other gaseous fluid is being released or discharged by the drilling mud, a trap 30 has been arranged in or adjacent the vessel 21 with a view of collecting such gas. In Fig. 1 the trap 30 is in the form of a housing 31 which is immersed somewhat in the liquid 20 so as to insure that any gas rising in the liquid from the diluted mud will be collected in the container. The gas thus collecting in the container 30 will be carried away in the conduit 40 to a combustion type meter 41. Any suitable means 42 may create a suction on the meter so that reduced pressure causes the collected gas to move through the conduit 40. A suitable vent 43 permits the entrance of air into the collection chamber and the conduit 40 with a view of compounding a combustible mixture of air and gas.

The meter 41 may be of any standard type, several of which are well known, and may be either an indicating or a recording meter as desired. The suction 42 may be in the form of an aspirator pump as shown or it may embody a mechanical suction device.

It is believed that a combustion type gas meter is well understood but Fig. 2 illustrates a wiring diagram thereof which has been found suitable, as disclosed in my above mentioned prior copending application.

The wiring diagram of such a combustion type meter embodies a circuit 50 having a source of electrical current 51 therein. This source may be a battery or any conventional source.

The circuit 50 includes a Wheatstone bridge arrangement 52 which embodies a balanced circuit where the legs 53, 54, 55, and 56 may be balanced as desired. The leg 53 may be exposed to the gas entering the meter 41 in such a manner that when the filament is energized, the resistance thereof will be altered as the gas is being burned, due to the fact that gas coming in contact with the heated filament will be burned and in this manner change the resistance of the filament.

A volt meter 58 is arranged from across the opposite sides of the bridge, and may have an adjustable zero needle 59 thereon, which can be moved along the leg 56 in order to obtain a zero adjustment when the meter is to be used. Thus, the meter is first turned on to heat the filaments and then a suction created so as to draw air across the exposed filament 53. The movement of the air across the filament unbalances the circuit and the needle 59 may be used to balance the circuit, after the filament has been heated, in order to obtain a null reading when air is passing the exposed filament 53.

The meter is then ready for operation by sucking in a charge of mixture, which is to be examined by subjecting it to combustion. The indicating or recording by the meter gives the information as to the pressure or absence of gas in the specimen passing the filament 53. The meter 41 is merely diagrammatic, the handle 60 being provided to turn the meter on and off, and the handle 61 serves to adjust the zero reading.

It is contemplated that the flooding of the drilling mud with a diluent liquid will cause a reduction in viscosity sufficiently to effect the release of gas entrained by the mud.

It is well understood in the art that the elevation and location of the source of the gas in the drilling mud may be determined by various operations, manipulations, and calculations, whereby the circulating time and volume, the depth of the drill bit and the bell, the weight of the drilling mud, and other circumstances can be taken into consideration. The method and apparatus thus provide a means and procedure of checking the drilling mud by diluting the mud so as to ascertain the nature and volume and the presence or absence of gas.

My prior copending application explains the logging of the wells by the detection of gas with a view of ascertaining the nature of the formations which have been drilled.

Broadly the invention contemplates a flooding process as applied to drilling muds to effect the release of gas carried by the mud.

What is claimed is:

1. A gas separator apparatus for use in separating entrapped gas in drilling mud returning from a well bore, comprising a container for collecting at least a portion of the returning mud, a vessel having a body of diluent therein, a conduit connected to said container and having an open discharge end disposed below the surface of the body of diluent whereby the drilling mud passing from said container to said vessel is diluted with the diluent to effect a release of the entrapped gas from the mud, and a bonnet having an open lower end disposed below the surface of the body of liquid above said open discharge end of said conduit to thereby collect the gas released from the diluted mud in the vessel.

2. A gas separator apparatus comprising, a vessel having therein a body of diluent liquid, a conductor pipe extending into the vessel and having an open discharge end disposed below the surface of said diluent liquid whereby returning drilling mud passing into the diluent is mixed therewith to release gas entrapped in the mud, and a bonnet having an open end extending below the surface of the diluent liquid and surrounding said open discharge end of said conductor for receiving the released gas for a subsequent analysis thereof.

3. A gas separator apparatus for use in separating entrapped gas in drilling mud returning from a well bore, comprising a container for collecting at least a portion of the returning mud, a vessel having a body of diluent therein, a conduit connected to said container and extending below the surface of the body of diluent, said conduit having a return bend therein and a discharge opening below the surface of the diluent, a valve in said conduit to regulate the flow of the drilling mud to said vessel, and a bonnet having a lower open end extending below the diluent surface and surrounding said discharge opening whereby gas which is released from the drilling mud by dilution with the diluent in the vessel is trapped in said bonnet for subsequent mixture with air for analysis.

ALONZO L. SMITH.

References Cited in the file of this patent

UNITED STATES PATENTS

| Number | Name | Date |
| --- | --- | --- |
| 1,847,864 | Cross | Mar. 1, 1932 |
| 1,857,034 | Snyder | May 3, 1932 |
| 2,341,169 | Wilson et al. | Feb. 8, 1944 |
| 2,400,046 | Hummel | May 7, 1946 |
| 2,489,180 | Hayward | Nov. 22, 1949 |